United States Patent
Tomita et al.

(10) Patent No.: US 9,457,345 B2
(45) Date of Patent: Oct. 4, 2016

(54) SILICON CARBIDE POROUS MATERIAL, HONEYCOMB STRUCTURE AND ELECTRIC HEATING-TYPE CATALYST CARRIER

(71) Applicant: NGK Insulators, Ltd., Nagoya (JP)

(72) Inventors: Takahiro Tomita, Nagoya (JP); Kiyoshi Matsushima, Nagoya (JP); Katsuhiro Inoue, Nagoya (JP); Yoshimasa Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 55 days.

(21) Appl. No.: 14/482,446

(22) Filed: Sep. 10, 2014

(65) Prior Publication Data
US 2014/0378297 A1    Dec. 25, 2014

Related U.S. Application Data

(63) Continuation of application No. PCT/JP2013/060262, filed on Mar. 28, 2013.

(30) Foreign Application Priority Data

Mar. 28, 2012    (JP) ................. 2012-073692

(51) Int. Cl.
*B01J 21/06*    (2006.01)
*B01J 21/12*    (2006.01)
(Continued)

(52) U.S. Cl.
CPC ............. *B01J 29/70* (2013.01); *B01J 27/224* (2013.01); *C04B 35/565* (2013.01);
(Continued)

(58) Field of Classification Search
CPC .......... B01J 21/06; B01J 21/12; B01J 23/02; B01J 27/224
USPC .............................. 502/178; 501/5, 9, 88, 89
See application file for complete search history.

(56) References Cited

U.S. PATENT DOCUMENTS

| 6,773,481 B2* | 8/2004 | Noguchi | B01D 39/2068 264/44 |
| 7,662,739 B2* | 2/2010 | Fujii | B01D 53/885 422/168 |

(Continued)

FOREIGN PATENT DOCUMENTS

| CN | 1883908 A | 12/2006 |
| JP | 08-218857 A1 | 8/1996 |
| JP | 2003-176185 A1 | 6/2003 |
| JP | 4307781 B2 | 8/2009 |
| JP | 4398260 B2 | 1/2010 |

OTHER PUBLICATIONS

Extended European Search Report (Application No. 13769487.3) dated Oct. 6, 2015.

(Continued)

*Primary Examiner* — Patricia L Hailey
(74) *Attorney, Agent, or Firm* — Burr & Brown, PLLC

(57) ABSTRACT

There is disclosed a silicon carbide porous material having a high thermal shock resistance. The silicon carbide porous material of the present invention includes silicon carbide particles, metal silicon and an oxide phase, and the silicon carbide particles are bonded to one another via at least one of the metal silicon and the oxide phase. Furthermore, the oxide phase includes a parent phase, and a dispersion phase dispersed in the parent phase and having a higher thermal expansion coefficient than the parent phase. Here, a lower limit value of a content ratio of the dispersion phase in the oxide phase is preferably 1 mass %, and upper limit value of the content ratio of the dispersion phase in the oxide phase is 40 mass %. Furthermore, it is preferable that the parent phase is cordierite and that the dispersion phase is mullite.

21 Claims, 1 Drawing Sheet

(51) Int. Cl.
    *B01J 23/02*     (2006.01)
    *B01J 27/224*     (2006.01)
    *B01J 29/70*     (2006.01)
    *C04B 35/565*     (2006.01)
    *C04B 38/00*     (2006.01)
    *C04B 35/63*     (2006.01)
    *B01J 35/04*     (2006.01)
    *B01J 21/16*     (2006.01)
    *C04B 111/00*     (2006.01)
    *C04B 111/20*     (2006.01)

(52) U.S. Cl.
    CPC ...... *C04B 35/6316* (2013.01); *C04B 38/0006* (2013.01); *B01J 21/16* (2013.01); *B01J 35/04* (2013.01); *C04B 2111/0081* (2013.01); *C04B 2111/2084* (2013.01); *C04B 2235/3208* (2013.01); *C04B 2235/3213* (2013.01); *C04B 2235/3217* (2013.01); *C04B 2235/349* (2013.01); *C04B 2235/3418* (2013.01); *C04B 2235/3826* (2013.01); *C04B 2235/428* (2013.01); *C04B 2235/663* (2013.01); *C04B 2235/80* (2013.01); *C04B 2235/96* (2013.01); *C04B 2235/9607* (2013.01)

(56) References Cited

U.S. PATENT DOCUMENTS

| | | |
|---|---|---|
| 2004/0033893 A1 | 2/2004 | Tomita et al. |
| 2005/0158534 A1* | 7/2005 | Tabuchi ............. B01D 39/2075 428/304.4 |
| 2005/0159292 A1* | 7/2005 | Pham ..................... B01D 53/94 501/80 |
| 2006/0121239 A1 | 6/2006 | Furukawa et al. |
| 2006/0234858 A1* | 10/2006 | Ichikawa ........... B01D 53/9454 502/178 |
| 2006/0292330 A1 | 12/2006 | Ohno et al. |
| 2009/0020902 A1 | 1/2009 | Tabuchi et al. |
| 2014/0011667 A1 | 1/2014 | Tomita et al. |

OTHER PUBLICATIONS

Chinese Office Action (With English Translation), Chinese Application No. 201380014127.2, dated Mar. 27, 2015 (16 pages).

English Translation of Written Opinion of the International Searching Authority, International Application No. PCT/JP2013/060262, dated Jul. 9, 2013 (5 pages).

International Search Report and Written Opinion (Application No. PCT/JP2013/060262) dated Jul. 9, 2013.

* cited by examiner

SILICON CARBIDE POROUS MATERIAL, HONEYCOMB STRUCTURE AND ELECTRIC HEATING-TYPE CATALYST CARRIER

BACKGROUND OF THE INVENTION

1. Field of the Invention

The present invention relates to a silicon carbide porous material, a honeycomb structure and an electric heating-type catalyst carrier.

2. Description of Related Art

A silicon carbide porous material in which silicon carbide particles are bonded by metal silicon and an oxide phase has an excellent thermal shock resistance and is therefore utilized as a material for a catalyst carrier or a DPF (e.g., see Patent Documents 1 and 2).

CITATION LIST

Patent Documents

[Patent Document 1] JP 4307781
[Patent Document 2] JP 4398260

SUMMARY OF THE INVENTION

Problem to be Solved by the Invention

In recent years, for a silicon carbide porous material, its size has been enlarged, its cell structure has been complicated, or its use environment has been severe, and hence improvement of a thermal shock resistance has further been required as compared with a conventional silicon carbide porous material. Incidentally, a thermal shock breakdown resistance coefficient R' which becomes an index of the thermal shock resistance is represented by:

$$R' = \sigma \cdot (1-\nu) \cdot \kappa / E \cdot \alpha,$$

where $\sigma$ is a breaking strength, $\nu$ is Poisson's ratio, $\kappa$ is a thermal conductivity, $E$ is Young's modulus, and $\alpha$ is a thermal expansion coefficient. Therefore, for the improvement of the thermal shock resistance, it is required that the strength is heightened, the Poisson's ratio is lowered, the thermal conductivity is heightened, the Young's modulus is lowered and the thermal expansion coefficient is lowered, and it is necessary to improve one of these requirements.

The present invention has been developed to solve such problems, and a main object thereof is to provide a silicon carbide porous material having a high thermal shock resistance.

Means for Solving the Problem

The present inventors have variously investigated a silicon carbide porous material including silicon carbide particles, metal silicon, and a cordierite containing oxide phase. As a result of such various investigations, it has been found that the oxide phase which includes cordierite and mullite and in which mullite is dispersed in cordierite has an excellent thermal shock resistance. Furthermore, it has been found that the oxide phase is not limited to the phase in which mullite is dispersed in cordierite and that a dispersion phase having a higher thermal expansion coefficient than a parent phase may be dispersed in the parent phase, whereby the present invention has been completed.

That is, a first aspect of the present invention is a silicon carbide porous material which includes silicon carbide particles, metal silicon and an oxide phase and in which the silicon carbide particles are bonded to one another via at least one of the metal silicon and the oxide phase. Furthermore, the oxide phase of this silicon carbide porous material includes a parent phase, and a dispersion phase dispersed in the parent phase and having a higher thermal expansion coefficient than the parent phase.

Second and third aspects of the present invention are a honeycomb structure and an electric heating-type catalyst carrier each of which is constituted of the silicon carbide porous material of the first aspect of the present invention.

Effect of the Invention

This silicon carbide porous material has a more excellent thermal shock resistance than a conventional silicon carbide porous material. Here, the thermal shock resistance is judged by, for example, presence/absence of cracks when the material is maintained at a predetermined high temperature and then taken out at room temperature. Each of the honeycomb structure of the second aspect of the present invention and the electric heating-type catalyst carrier of the third aspect of the present invention uses the silicon carbide porous material of the first aspect of the present invention, and therefore has the excellent thermal shock resistance.

DETAILED DESCRIPTION OF THE INVENTION

Figure 1:
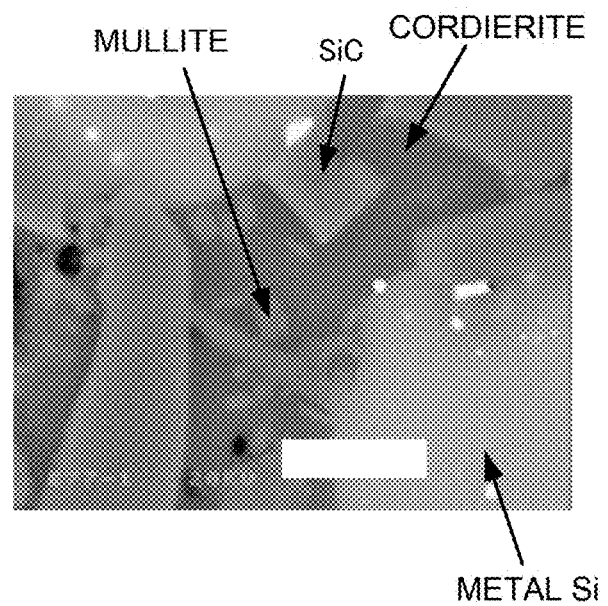
FIG. 1 is a microstructure photograph of a silicon carbide porous material of Example 1.

A silicon carbide porous material of a first aspect of the present invention includes silicon carbide particles, metal silicon, and an oxide phase, and the silicon carbide particles are bonded to one another via at least one of the metal silicon and the oxide phase. Furthermore, in the silicon carbide porous material of the first aspect of the present invention, as a sintering auxiliary agent, boron, carbon or a metal oxide may be included, and $B_4C$ or an oxide of a rare earth metal may be included. Examples of a shape of the silicon carbide porous material include a plate, a tube, a lotus root, and a honeycomb. In the case of the honeycomb shape, for example, a minimum value of a thickness of partition walls is preferably 30 μm and further preferably 50 μm. Furthermore, a maximum value of the thickness of the partition walls is preferably 1000 μm, further preferably 500 μm, and especially preferably 200 μm. Furthermore, a minimum value of a cell density is preferably 10 cells/cm$^2$, further preferably 20 cells/cm$^2$, and especially preferably 50 cells/cm$^2$. Furthermore, a maximum value of the cell density is preferably 200 cells/cm$^2$ and further preferably 150 cells/cm$^2$.

The oxide phase of the silicon carbide porous material of the first aspect of the present invention includes a parent phase and a dispersion phase which is present in the parent phase in a dispersed manner. Furthermore, the dispersion phase has a higher thermal expansion coefficient than the parent phase. Here, there is not any special restriction on a difference of a thermal expansion coefficient (a linear thermal expansion coefficient) between the parent phase and the dispersion phase, however the difference is, for example, preferably $1\times10^{-6}$/K or more and $1\times10^{-5}$/K or less. It is to be noted that the oxide phase may be a crystalline phase or an amorphous phase or may include both the phases.

The parent phase is preferably an oxide including an alkaline earth metal, aluminum, and silicon. The alkaline earth metal is preferably Mg, Ca, or Sr and more preferably Mg. Specifically, examples of the oxide include cordierite ($Mg_2Al_4Si_5O_{18}$) sapphirine ($Mg_4Al_{10}Si_2O_{23}$), anorthite ($CaAl_2Si_2O_8$), and strontium aluminosilicate ($SrAl_2Si_2O_8$). In these examples, cordierite is preferable. This is because cordierite has a small thermal expansion coefficient and can further improve the thermal shock resistance.

The dispersion phase is preferably an oxide including one or more of an alkaline earth metal, aluminum, and silicon. Examples of the oxide including all of the alkaline earth metal, aluminum and silicon include sapphirine, anorthite, and strontium aluminosilicate. Examples of the oxide including two of the alkaline earth metal, aluminum and silicon include mullite ($Al_6Si_2O_{13}$), spinel ($MgAl_2O_4$), forsterite ($Mg_2SiO_4$), and protoenstatite ($MgSiO_3$). Furthermore, examples of the oxide including one of the alkaline earth metal, aluminum and silicon include cristobalite ($SiO_2$), silica ($SiO_2$), alumina ($Al_2O_3$), and magnesia (MgO). In these examples, the dispersion phase is preferably mullite. This is because mullite can improve the thermal shock resistance. In particular, when the parent phase is cordierite, the thermal shock resistance can further be improved.

As a reference, Table 1 indicates approximate values of the linear thermal expansion coefficients of the oxides illustrated as the parent phase and the dispersion phase at room temperature to about 800° C.

TABLE 1

| Oxide | | Linear thermal expansion coefficient* |
|---|---|---|
| Name | Composition formula | $K^{-1}$ |
| Cordierite | $Mg_2Al_4Si_5O_{18}$ | $2 \times 10^{-6}$ |
| Sapphirine | $Mg_4Al_{10}Si_2O_{23}$ | $7\sim8 \times 10^{-6}$ |
| Anorthite | $CaAl_2Si_2O_8$ | $6\sim7 \times 10^{-6}$ |
| Strontium aluminosilicate | $SrAl_2Si_2O_8$ | $5\sim6 \times 10^{-6}$ |
| Mullite | $Al_6Si_2O_{13}$ | $5 \times 10^{-6}$ |
| Spinel | $MgAl_2O_4$ | $8\sim9 \times 10^{-6}$ |
| Forsterite | $Mg_2SiO_4$ | $8\sim11 \times 10^{-6}$ |
| Protoenstatite | $MgSiO_3$ | $8\sim10 \times 10^{-6}$ |
| Cristobalite | $SiO_2$ | $10\sim16 \times 10^{-6}$ |
| Alumina | $Al_2O_3$ | $8 \times 10^{-6}$ |

*value at room temperature to about 800° C.

A lower limit value of a content ratio of the dispersion phase in the oxide phase is preferably 1 mass %. Furthermore, an upper limit value of the content ratio of the dispersion phase in the oxide phase is preferably 40 mass %. When the content ratio is 1 mass % or more, an effect of improving the thermal shock resistance can be obtained. Furthermore, when the content ratio is 40 mass % or less, a volume change due to thermal expansion is not excessively large. The lower limit value of the content ratio of the dispersion phase in the oxide phase is further preferably 7 mass %. Furthermore, the upper limit value of the content ratio of the dispersion phase in the oxide phase is further preferably 38 mass %.

In the oxide phase, a lower limit value of an average particle diameter of the dispersion phase is preferably 0.1 μm, further preferably 0.2 μm, and especially preferably 0.3 μm. An upper limit value of the average particle diameter of the dispersion phase is preferably 5 μm, further preferably 4 μm, and especially preferably 3 μm. When the average particle diameter is 0.1 μm or more, the thermal shock resistance can be improved. Furthermore, when the average particle diameter is 5 μm or less, deformation of the dispersion phase due to the thermal expansion is not excessively large. Here, a size (a particle diameter) of particles of the dispersion phase can be obtained as an average value of long diameters and short diameters during observation of a microstructure. It is to be noted that the particle diameter mentioned herein is the average value (the average particle diameter) of the dispersion phase included in an observation view field. Additionally, the microstructure observation was performed at 2000 to 5000 times. A shape of the dispersion phase may be an isotropic shape (e.g., a spherical shape) or may be a large anisotropic shape such as a plate shape, a needle shape or a fiber shape, however is further preferably an anisotropic large shape and further preferably the needle shape. This is because the thermal shock resistance can further be improved.

In the silicon carbide porous material of the first aspect of the present invention, a content ratio of silicon carbide preferably has a lower limit value of 50 mass % and an upper limit value of 80 mass %. Furthermore, a content ratio of metal silicon preferably has a lower limit value of 15 mass % and an upper limit value of 45 mass %. Furthermore, a content ratio of an oxide preferably has a lower limit value of 1 mass % and an upper limit value of 25 mass %. Furthermore, in the silicon carbide porous material of the first aspect of the present invention, the content ratio of silicon carbide further preferably has a lower limit value of 55 mass % and an upper limit value of 75 mass %. Furthermore, the content ratio of the metal silicon further preferably has a lower limit value of 20 mass % and an upper limit value of 40 mass %. Furthermore, the content ratio of the oxide further preferably has a lower limit value of 2 mass % and an upper limit value of 20 mass %. In this case, the thermal shock resistance and resistance heat generation characteristics further improve.

There is not any special restriction on a strength of the silicon carbide porous material of the first aspect of the present invention, however a lower limit value is preferably 10 MPa and further preferably 20 MPa. An upper limit value of the strength of the silicon carbide porous material of the first aspect of the present invention is preferably 80 MPa and further preferably 70 MPa. When the strength is smaller than 10 MPa, the thermal shock resistance unfavorably deteriorates. There is nothing better than a high strength, however an upper limit is 80 MPa because the silicon carbide porous material is used. In the present description, the strength is a value calculated as follows, when the silicon carbide porous material is a honeycomb structure (i.e., the honeycomb structure silicon carbide porous material). A test piece is processed so that a direction in which cells pass through the silicon carbide porous material of the honeycomb structure is a longitudinal direction, and a bending strength is calculated by a bending test in conformity with JIS R1601. Afterward, the value is calculated by the following equation in which a separately measured open area ratio of the honeycomb structure is used.

Strength=the bending strength of the honeycomb structure/{1−(the open area ratio/100)}

There is not any special restriction on Young's modulus of the silicon carbide porous material of the first aspect of the present invention, however a lower limit value is preferably 5 GPa. Furthermore, an upper limit value of the Young's modulus of the silicon carbide porous material of the first aspect of the present invention is preferably 50 GPa. When the Young's modulus is smaller than 5 GPa, a rigidity is unfavorably excessively small. Furthermore, when the Young's modulus is larger than 50 GPa, the thermal shock resistance unfavorably deteriorates. In the present description, the Young's modulus is a value calculated as follows, when the silicon carbide porous material is the honeycomb structure (i.e., the honeycomb structure silicon carbide porous material). A test piece is processed so that the direction in which the cells pass through the silicon carbide porous material of the honeycomb structure is the longitudinal direction, and the Young's modulus is calculated by a resonance method (a suspending span of 50 mm) in conformity with JIS R1602. Afterward, the value is calculated by the following equation in which the separately measured open area ratio of the honeycomb structure is used.

Young's modulus=the Young's modulus of the honeycomb structure/{1−(the open area ratio/100)}

In the silicon carbide porous material of the first aspect of the present invention, a lower limit value of a ratio of the strength to the Young's modulus (the strength/Young's modulus ratio) is preferably $1.2 \times 10^{-3}$ and further preferably $1.6 \times 10^{-3}$. In the silicon carbide porous material of the first aspect of the present invention, an upper limit value of the ratio of the strength to the Young's modulus (the strength/Young's modulus ratio) is preferably $3.0 \times 10^{-3}$ and further preferably $2.0 \times 10^{-3}$.

In the silicon carbide porous material of the first aspect of the present invention, a lower limit value of the linear thermal expansion coefficient at room temperature to 800° C. is preferably $3.8 \times 10^{-6}$/K and further preferably $4.0 \times 10^{-6}$/K. In the silicon carbide porous material of the first aspect of the present invention, an upper limit value of the linear thermal expansion coefficient at room temperature to 800° C. is preferably $4.8 \times 10^{-6}$/K and further preferably $4.7 \times 10^{-6}$/K. There is nothing better than a small linear thermal expansion coefficient, however a lower limit is $3.8 \times 10^{-6}$/K because the silicon carbide porous material is used. Furthermore, when the linear thermal expansion coefficient is larger than $4.8 \times 10^{-6}$/K, the thermal shock resistance unfavorably deteriorates. In the present description, the thermal expansion coefficient is a value measured by a method in conformity with JIS R1618. Specifically, a test piece having a size of 3 vertical cells×3 horizontal cells×20 mm length is cut out from the honeycomb structure, and there is measured a value of an average linear thermal expansion coefficient (the thermal expansion coefficient) at 40 to 800° C. in an A-axis direction (a direction parallel to through channels of the honeycomb structure).

In the silicon carbide porous material of the first aspect of the present invention, a lower limit value of an open porosity is preferably 10%. Furthermore, an upper limit value of the open porosity is preferably 70%. When the open porosity is smaller than 10%, a catalyst, unfavorably, is not easily loaded during use as a catalyst carrier. When the open porosity is larger than 70%, a volume resistivity is unfavorably excessively large. It is to be noted that a lower limit value of the open porosity is further preferably 20%. Furthermore, an upper limit value of the open porosity is further preferably 40%. In the present description, the open porosity is a value calculated from a total pore volume (unit: cm$^3$/g) by mercury porosimetry (in conformity with JIS R 1655) and an apparent density (unit: g/cm$^3$) by a dry type automatic density measuring instrument by a gas phase substitution method, in the following equation. It is to be noted that the open porosity can be regulated in accordance with, for example, an amount of a pore former, an Si/SiC ratio, an amount of the sintering auxiliary agent, a firing atmosphere or the like for use during manufacturing of the silicon carbide porous material.

Open porosity [%]=the total pore volume/{(1/the apparent density)+the total pore volume}×100

There is not any special restriction on an average pore diameter of the silicon carbide porous material of the first aspect of the present invention, however a lower limit value is preferably 2 μm. Furthermore, an upper limit value of the average pore diameter is preferably 50 μm. When the average pore diameter is smaller than 2 μm, the catalyst, unfavorably, is not easily loaded during the use as the catalyst carrier. Furthermore, when the average pore diameter is larger than 50 μm, the strength unfavorably deteriorates. An upper limit value of the average pore diameter is further preferably 15 μm. In the present description, the average pore diameter is a value measured by the mercury porosimetry (in conformity with JIS R 1655).

There is not any special restriction on a thermal conductivity of the silicon carbide porous material of the first aspect of the present invention, however a lower limit value is preferably 10 W/m·K. An upper limit value of the thermal conductivity is preferably 70 W/m·K. When the thermal conductivity is smaller than 10 W/m·K, there is the fear that unevenness unfavorably occurs in a temperature distribution even in a case where energization is caused by attaching a plus pole and a minus pole to generate heat. It is to be noted that there is nothing better than a high thermal conductivity, however 70 W/m·K is the upper limit because the silicon carbide porous material is used. In the present description, the thermal conductivity is a value obtained as a product of specific heat, thermal diffusivity and bulk density.

The silicon carbide porous material of the first aspect of the present invention preferably has a structure where the silicon carbide particles are bonded by metal silicon. Furthermore, metal silicon is preferably covered with the oxide phase. In this case, the thermal shock resistance and resistance heat generation characteristics further easily improve. It is to be noted that when metal silicon is covered with the oxide phase, a lower limit value of a film thickness of the oxide phase is preferably 0.1 μm. Furthermore, an upper limit value of the film thickness of the oxide phase is preferably 10 μm.

Hereinafter, as to a method of manufacturing the silicon carbide porous material of the first aspect of the present invention, an example where the silicon carbide porous material is a honeycomb structure will be described.

First, silicon carbide powder, metal silicon powder and oxide phase raw material powder are mixed, and a binder, a surfactant, a pore former, water and the like are added as needed, to prepare a forming raw material. A lower limit value of a mass of the metal silicon powder is preferably about 40 mass % to a total of a mass of the silicon carbide powder and the mass of the metal silicon powder. An upper limit value of the mass of the metal silicon powder is preferably about 40 mass % to the total of the mass of the silicon carbide powder and the mass of the metal silicon powder. A lower limit value of an average particle diameter of the silicon carbide powder is preferably 5 μm and further preferably 20 μm. An upper limit value of the average particle diameter of the silicon carbide powder is preferably 100 μm and further preferably 40 μm. A lower limit value of the average particle diameter of the metal silicon powder is preferably 0.1 μm and further preferably 1 μm. An upper limit value of the average particle diameter of the metal silicon powder is preferably 20 μm and further preferably 10

μm. A lower limit value of the average particle diameter of the oxide phase raw material powder is preferably 0.1 μm and further preferably 1 μm. An upper limit value of the average particle diameter of the oxide phase raw material powder is preferably 50 μm and further preferably 10 μm. These average particle diameters are values measured by a laser diffraction method. It is to be noted that as the oxide phase raw material powder, there may be used a raw material having a composition of the parent phase and a raw material having a composition of the dispersion phase which does not react with the raw material having the composition of the parent phase, or a raw material which reacts during firing to generate the parent phase and the dispersion phase. In the latter case, for example, an alkaline earth metal source, an Al source and a Si source may be used at such a ratio as to obtain a predetermined composition. As the alkaline earth metal source, the Al source and the Si source, for example, an oxide, a hydroxide, a carbonate or the like can be used. Specifically, talc ($3MgO.4SiO_2.H_2O$) kaolin ($2SiO_2.Al_2O_3.2H_2O$), alumina, aluminum hydroxide, silica, calcium carbonate, strontium carbonate or the like can be used. It is to be noted that a blend ratio of the raw materials may be determined on the basis of a ratio of the alkaline earth metal oxide (e.g., MgO), $Al_2O_3$ and $SiO_2$ which is obtained so as to obtain a desired parent phase and dispersion phase, from a ternary phase diagram of the alkaline earth metal oxide (e.g., MgO), $Al_2O_3$ and $SiO_2$.

Examples of the binder include organic binders such as methylcellulose, hydroxypropoxyl cellulose, hydroxyethyl cellulose, carboxymethyl cellulose and polyvinyl alcohol. In these examples, methylcellulose and hydroxypropoxyl cellulose are preferably used together. A content of the binder is preferably from 2 to 10 mass % to the whole forming raw material.

As the surfactant, ethylene glycol, dextrin, fatty acid soap, polyalcohol or the like can be used. One of these surfactants may be used alone or any combination of two or more of the surfactants may be used. A content of the surfactant is preferably 2 mass % or less to the whole forming raw material.

There is not any special restriction on the pore former as long as the pore former becomes the pores after the firing, and examples of the pore former include graphite, starch, resin balloons, a water absorbable resin, and a silica gel. A content of the pore former is preferably 10 mass % or less to the whole forming raw material. A lower limit value of an average particle diameter of the pore former is preferably 10 μm. Furthermore, an upper limit value of the average particle diameter of the pore former is preferably 30 μm. When the average particle diameter is smaller than 10 μm, the pores cannot sufficiently be formed sometimes. When the average particle diameter is larger than 30 μm, a die is clogged sometimes during the forming. The average particle diameter of the pore former is a value measured by the laser diffraction method. Furthermore, when the water absorbable resin is used, the average particle diameter is preferably a value after water is absorbed.

A content of the water is suitably regulated so that a kneaded material has such a hardness as to be easily formed, however the content of the water is preferably from 20 to 60 mass % to the whole forming raw material.

Next, the forming raw material is kneaded to form the kneaded material. There is not any special restriction on a method of kneading the forming raw material to form the kneaded material, and an example of the method is a method in which a kneader, a vacuum pugmill or the like is used.

Next, the kneaded material is extruded to form a honeycomb formed body. In the extrusion, the die having desirable whole shape, cell shape, partition wall thickness, cell density and the like is preferably used. A material of the die is preferably cemented carbide which does not easily wear away. The honeycomb formed body is a structure having porous partition walls defining and forming a plurality of cells which become through channels of a fluid and a circumferential wall positioned in an outermost circumference. The partition wall thickness, cell density, circumferential wall thickness and the like of the honeycomb formed body can suitably be determined in accordance with the structure of the honeycomb structure which is to be prepared, in consideration of shrinkages during drying and firing. The honeycomb formed body obtained in this manner is preferably dried prior to the firing. There is not any special restriction on a drying method, and examples of the method include electromagnetic heating systems such as microwave heating drying and high-frequency dielectric heating drying, and external heating systems such as hot air drying and superheated steam drying. As the drying method, it is preferable that a predetermined amount of water content is dried by the electromagnetic heating system and then the remaining water content is dried by the external heating system, because the whole formed body can rapidly and evenly be dried so that any cracks are not generated. Specifically, as drying conditions, it is preferable that 30 to 99 mass % of water content is removed from an amount of the water content prior to the drying by the electromagnetic heating system and then the water content is reduced to 3 mass % or less by the external heating system. As the electromagnetic heating system, the dielectric heating drying is preferable, and as the external heating system, the hot air drying is preferable.

Next, when a length of the honeycomb formed body in a central axis direction is not a desirable length, both end faces (both end portions) are preferably cut to obtain the desirable length. There is not any special restriction on a cutting method, however an example of the method is a method in which a round saw cutter or the like is used.

Next, the honeycomb formed body is fired to prepare the honeycomb structure. Prior to the firing, calcinating is preferably performed to remove the binder and the like. The calcinating is preferably performed in the air atmosphere. A lower limit value of a calcinating temperature is preferably 200° C. Furthermore, an upper limit value of the calcinating temperature is preferably 600° C. Furthermore, a lower limit value of a calcinating time is preferably 0.5 hour. An upper limit value of the calcinating time is preferably 20 hours. The firing is preferably performed in a non-oxidizing atmosphere of nitrogen, argon or the like (an oxygen partial pressure is $10^{-4}$ atm or less). A lower limit value of a firing temperature is preferably 1300° C. An upper limit value of the firing temperature is preferably 1600° C. Furthermore, the firing is preferably performed at ordinary pressure. Furthermore, a lower limit value of a firing time is preferably one hour. Furthermore, an upper limit value of the firing time is preferably 20 hours. Furthermore, after the firing, an oxidation treatment is preferably performed to improve durability. The oxidation treatment is preferably performed in the air atmosphere (steam may be included). Furthermore, a lower limit value of a temperature of the oxidation treatment is preferably 1100° C. Furthermore, an upper limit value of the temperature of the oxidation treatment is preferably 1400° C. Furthermore, a lower limit value of an oxidation treatment time is preferably one hour. Furthermore, an upper limit value of the oxidation treatment time is preferably 20 hours. It is to be noted that the calcinating and the firing can be performed by using, for example, an electric furnace, a gas furnace or the like.

The honeycomb structure constituted of the silicon carbide porous material of the first aspect of the present invention is utilized as, for example, a DPF or a catalyst converter when a noble metal catalyst is loaded onto the honeycomb structure. That is, one utilization embodiment of the honeycomb structure of the present invention is a catalyst carrier. Furthermore, as to the catalyst converter, an electric heating-type catalyst converter is required to have a high thermal shock resistance, and hence it is especially preferable to use an electric heating-type catalyst carrier in which the silicon carbide porous material of the first aspect of the present invention is utilized.

It is to be noted that the present invention is not limited to the abovementioned embodiment, and needless to say, the present invention can be carried out in various modes within the technical scope of the present invention.

EXAMPLES

Hereinafter, there will be described an example where a honeycomb structure constituted of a silicon carbide porous material of the present invention is specifically prepared.

Example 1

Silicon carbide powder, metal silicon powder, talc ($3MgO \cdot 4SiO_2 \cdot H_2O$), aluminum hydroxide and silica were mixed at a mass ratio shown in Table 2. Here, talc, aluminum hydroxide and silica are materials which form an oxide phase. Additionally, according to after-mentioned X-ray diffractometry, it was possible to confirm that a parent phase became cordierite and a dispersion phase became mullite in Example 1. To this material, hydroxypropyl methylcellulose was added as a binder, a water absorbable resin was added as a pore former, and water was also added to obtain a forming raw material, and the forming raw material was kneaded and pugged to prepare a columnar kneaded material. A content of the binder was 7 mass % to a total of silicon carbide (SiC) powder and metal silicon (metal Si) powder, a content of the pore former was 2 mass % to the total of the silicon carbide powder and the metal silicon powder, and a content of the water was 35 mass % to the total of the silicon carbide powder and the metal silicon powder. An average particle diameter of the silicon carbide powder was 30 µm and an average particle diameter of the metal silicon powder was 6 µm. Furthermore, an average particle diameter of the pore former was 20 µm. Additionally, the average particle diameters of silicon carbide, metal silicon and the pore former are values measured by a laser diffraction method.

The obtained columnar kneaded material was formed into a honeycomb shape by use of an extrusion machine to obtain a honeycomb formed body. The obtained honeycomb formed body was dried by dielectric heating and then dried at 120° C. for two hours by use of a hot air dryer to obtain a honeycomb dried body.

The obtained honeycomb dried body was degreased at 550° C. in the air atmosphere for three hours, fired at about 1450° C. in an Ar inert atmosphere for two hours, and then subjected to an oxidation treatment at 1200° C. for four hours to obtain a honeycomb structure silicon carbide porous material (a honeycomb structure).

Figure 2:
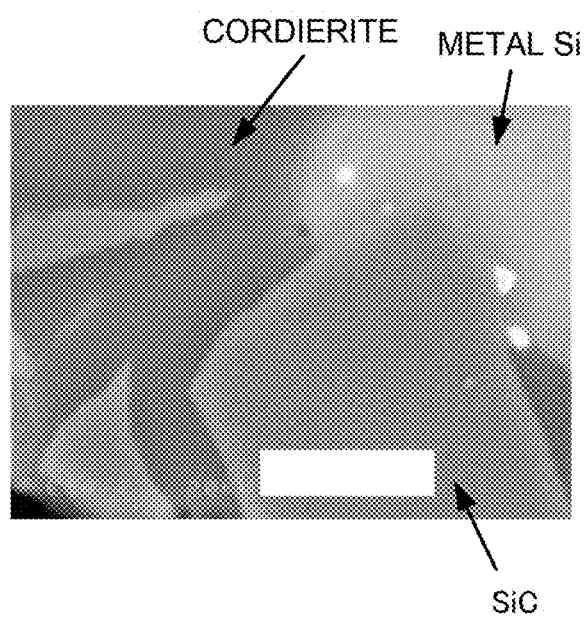
FIG. 2 is a microstructure photograph of a silicon carbide porous material of Comparative Example 4.

In the honeycomb structure at this time, a thickness of partition walls was 90 µm and a cell density was 90 cells/cm². Furthermore, a bottom surface of the honeycomb structure had a circular shape having a diameter of 93 mm, and a length of the honeycomb structure in a cell extending direction was 100 mm. FIG. 1 shows a microstructure photograph of a cross section of this honeycomb structure. Furthermore, for comparison, FIG. 2 shows a microstructure photograph of a cross section of a honeycomb structure of Comparative Example 4 which does not have a dispersion phase. Identification of metal Si, SiC, cordierite and mullite was performed together with identification of a constitutional phase by powder XRD, on the basis of the results of qualitative/quantitative analysis by an EPMA and element mapping. In consequence, it was confirmed that the honeycomb structure of Example 1 included silicon carbide particles, metal silicon and an oxide phase and that the oxide phase included the parent phase (cordierite) and the dispersion phase (mullite) dispersed in the parent phase.

In the obtained silicon carbide porous material of the honeycomb structure, an open porosity was 36%, an average pore diameter was 12 µm, a strength was 41 MPa, Young's modulus was 22 GPa, a thermal conductivity was 46 W/mK, and an average linear thermal expansion coefficient was $4.3 \times 10^{-6} K^{-1}$. Furthermore, in an electric furnace spalling test in which a thermal shock resistance was evaluated, the evaluation was "○" and a high thermal shock resistance was shown. Table 3 summarizes these results. It is to be noted that Table 3 also shows the results of after-mentioned Examples 2 to 11 and Comparative Examples 1 to 5.

Additionally, values of respective parameters were obtained as follows.

Composition

A composition of the silicon carbide porous material of the honeycomb structure was measured by an internal standard method of powder X-ray diffraction. Additionally, a deviation between a composition ratio of the raw material and a composition ratio of the silicon carbide porous material was about 1%.

Open Porosity

The open porosity was calculated from a total pore volume [cm³/g] by mercury porosimetry (in conformity with JIS R 1655) and an apparent density [g/cm³] by a dry type automatic density measuring instrument by a gas phase substitution method, in the following equation.

Open porosity [%]=the total pore volume/{(1/the apparent density)+the total pore volume}×100

Average Pore Diameter

The average pore diameter was measured by the mercury porosimetry (in conformity with JIS R 1655).

Strength

A test piece (5 vertical cells×10 horizontal cells×40 mm length) was processed so that a direction in which cells passed through the honeycomb structure was a longitudinal direction, and a bending strength of the honeycomb structure was calculated by a bending test in conformity with JIS R1601. Afterward, the value was calculated by the following equation in which a separately measured open area ratio of the honeycomb structure was used.

Strength=the bending strength of the honeycomb structure/{1−(the open area ratio/100)}

Young's Modulus

A test piece (5 vertical cells×10 horizontal cells×70 mm length) was processed so that the direction in which the cells passed through the honeycomb structure was the longitudinal direction, and the Young's modulus was measured by a resonance method in which a suspending span was 50 mm.

Thermal Conductivity

The thermal conductivity was calculated as a product of specific heat, a thermal diffusivity and a bulk density. Additionally, the specific heat was measured by a DSC method and the thermal diffusivity was measured by a light alternating current method. Furthermore, the bulk density was calculated from the following equation.

Bulk density=1/{(1/the apparent density)+the total pore volume}

Average Linear Thermal Expansion Coefficient

An average linear thermal expansion coefficient at room temperature to 800° C. was measured in conformity with JIS R1618.

Electric Furnace Spalling Test (Rapid Cooling Test)

The honeycomb structure was heated at a predetermined temperature in an electric furnace for two hours, and an even temperature was obtained. Afterward the honeycomb structure was taken out at room temperature, and the presence/absence of generation of cracks was visually observed. At this time, when the predetermined temperature was set to 700° C. and any cracks were not generated, the honeycomb structure was evaluated as "○"; when the predetermined temperature was set to 700° C. and the cracks were generated, the honeycomb structure was evaluated as "Δ"; and when the temperature was lower than the predetermined temperature and the cracks were generated, the honeycomb structure was evaluated as "x". It is indicated that when the temperature at which the cracks are generated is higher, the thermal shock resistance is higher.

Examples 2 to 10

Silicon carbide porous materials of Examples 2 to 10 were manufactured in conformity with Example 1 except that raw material compositions shown in Table 2 were used.

Example 11

A silicon carbide porous material of Example 11 was manufactured in conformity with Example 1 except that calcium carbonate was used in place of talc and a raw material composition shown in Table 2 was used.

Comparative Examples 1 and 2

Silicon carbide porous materials of Comparative Examples 1 and 2 were manufactured in conformity with Example 1 except that strontium carbonate was used in place of talc and raw material compositions shown in Table 2 were used.

Comparative Examples 3 and 4

Silicon carbide porous materials of Comparative Examples 3 and 4 were manufactured in conformity with Example 1 except that raw material compositions shown in Table 2 were used.

Comparative Example 5

A silicon carbide porous material of Comparative Example 5 was manufactured in conformity with Example 1 except that strontium carbonate was used together with talc and a raw material composition shown in Table 2 was used.

As is clear from Table 3, the evaluations of the electric furnace spalling test were "○" in Examples 1 to 11, however the evaluations were "Δ" in Comparative Examples 3 to 5 and "x" in Comparative Examples 1 and 2. In consequence, it has been found that as compared with the silicon carbide porous materials of Comparative Examples 1 to 5, the silicon carbide porous materials of Examples 1 to 11 have an excellent thermal shock resistance.

Such test results are considered in the following. In Examples 1 to 11, there were satisfied conditions that the silicon carbide porous material included the parent phase and the dispersion phase and that the dispersion phase had a larger thermal expansion coefficient than the parent phase. On the other hand, in each of Comparative Examples 1 to 4, the silicon carbide porous material did not include the dispersion phase, and in Comparative Example 5, the silicon carbide porous material included the dispersion phase, however the parent phase had a larger thermal expansion coefficient than the dispersion phase. Therefore, it was considered that in Examples 1 to 11, it was possible to obtain suitable test results, however in Comparative Examples 1 to 5, it was not possible to obtain suitable results. Furthermore, Examples 1 to 11 satisfied all of an average linear thermal expansion coefficient of $4.6 \times 10^{-6}$/K or less, a thermal conductivity of 30 W/mK or more and a strength/Young's modulus ratio of 1.60 or more, however Comparative Examples 1 to 5 did not satisfy at least one of the average linear thermal expansion coefficient, the thermal conductivity and the strength/Young's modulus ratio. It is considered that this fact is a factor by which the suitable test results could be obtained in Examples 1 to 11 and the suitable results could not be obtained in Comparative Examples 1 to 5.

It is to be noted that in Examples 1 to 5 in which the parent phase is cordierite and the dispersion phase is mullite, there are tendencies that the average linear thermal expansion coefficient is low, the thermal conductivity is high and the strength/Young's modulus ratio is high, and hence it has been found that this combination is suitable. Furthermore, also in Examples 6 to 10 in which the parent phase is cordierite and a type of dispersion phase is varied, suitable test results can be obtained. Therefore, it has been supposed that even when the type of dispersion phase is not the type illustrated here, a similar effect can be obtained as long as the dispersion phase has a higher thermal expansion coefficient than the parent phase. Furthermore, also in Example 11 in which the parent phase is not cordierite but is anorthite, the suitable test result can be obtained, and hence it has been supposed that even when the type of parent phase is not the type illustrated here, a similar effect can be obtained.

TABLE 2

| | Raw material composition | | | | | | |
|---|---|---|---|---|---|---|---|
| | Silicon carbide Mass % | Metal silicon Mass % | Talc Mass % | Aluminum hydroxide Mass % | Silica Mass % | Calcium carbonate Mass % | Strontium carbonate Mass % |
| Example 1 | 62.9 | 27.5 | 3.0 | 4.7 | 1.9 | 0 | 0 |
| Example 2 | 59.0 | 32.5 | 2.6 | 4.2 | 1.7 | 0 | 0 |
| Example 3 | 58.9 | 32.4 | 2.1 | 4.8 | 1.7 | 0 | 0 |
| Example 4 | 58.9 | 32.4 | 1.9 | 5.1 | 1.8 | 0 | 0 |
| Example 5 | 59.1 | 32.5 | 2.8 | 4.0 | 1.7 | 0 | 0 |
| Example 6 | 59.0 | 32.4 | 2.5 | 4.6 | 1.4 | 0 | 0 |
| Example 7 | 59.0 | 32.5 | 3.4 | 4.2 | 0.9 | 0 | 0 |
| Example 8 | 59.1 | 32.5 | 3.2 | 4.1 | 1.2 | 0 | 0 |
| Example 9 | 59.3 | 32.6 | 2.6 | 3.2 | 2.4 | 0 | 0 |
| Example 10 | 59.2 | 32.6 | 4.3 | 3.2 | 0.7 | 0 | 0 |
| Example 11 | 58.5 | 32.1 | 0.0 | 4.8 | 2.5 | 2.1 | 0 |
| Comparative Example 1 | 67.4 | 29.8 | 0.0 | 0.9 | 0.7 | 0 | 1.1 |
| Comparative Example 2 | 67.4 | 29.8 | 0.0 | 0.9 | 0.7 | 0 | 1.1 |
| Comparative Example 3 | 63.0 | 27.5 | 3.4 | 4.2 | 1.9 | 0 | 0 |
| Comparative Example 4 | 59.1 | 32.5 | 3.0 | 3.7 | 1.7 | 0 | 0 |
| Comparative Example 5 | 58.4 | 32.1 | 0.4 | 3.3 | 2.4 | 0 | 3.3 |

TABLE 3

| | Composition | | | | | | |
|---|---|---|---|---|---|---|---|
| | Silicon carbide | Metal silicon | Parent Phase | | Dispersion phase | | Ratio of dispersion phase in oxide phase |
| | Mass % | Mass % | (Compound name) | Mass % | (Compound name) | Mass % | Mass % |
| Example 1 | 64 | 28 | Cordierite | 7 | Mullite | 1 | 13 |
| Example 2 | 60 | 33 | Cordierite | 6 | Mullite | 1 | 14 |
| Example 3 | 60 | 33 | Cordierite | 5 | Mullite | 2 | 29 |
| Example 4 | 60 | 33 | Cordierite | 4.5 | Mullite | 2.5 | 36 |
| Example 5 | 60 | 33 | Cordierite | 7 | Mullite | 0.5 | 7 |
| Example 6 | 60 | 33 | Cordierite | 6 | Alumina | 1 | 14 |
| Example 7 | 60 | 33 | Cordierite | 6 | Spinel | 1 | 14 |
| Example 8 | 60 | 33 | Cordierite | 6 | Sapphirine | 1 | 14 |
| Example 9 | 60 | 33 | Cordierite | 6 | Cristobalite | 1 | 14 |
| Example 10 | 60 | 33 | Cordierite | 6 | Forsterite | 1 | 14 |
| Example 11 | 60 | 33 | Anorthite | 6 | Alumina | 1 | 14 |
| Comparative Example 1 | 68 | 30 | Strontium aluminosilicate | 2 | — | — | 0 |
| Comparative Example 2 | 68 | 30 | Strontium aluminosilicate | 2 | — | — | 0 |
| Comparative Example 3 | 64 | 28 | Cordierite | 8 | — | — | 0 |
| Comparative Example 4 | 60 | 33 | Cordierite | 7 | — | — | 0 |
| Comparative Example 5 | 60 | 33 | Strontium aluminosilicate | 6 | Cordierite | 1 | 14 |

| | Properties | | | | | | | |
|---|---|---|---|---|---|---|---|---|
| | Open porosity % | Ave. pore dia. μm | Ave. linear thermal expansion coefficient ppm/K | Thermal conductivity W/mK | Strength MPa | Young's modulus GPa | Strength/ Young's modulus (×10⁻³) | Electric furnace spalling test — |
| Example 1 | 36 | 12 | 4.3 | 46 | 41 | 22 | 1.84 | ○ |
| Example 2 | 36 | 11 | 4.3 | 44 | 42 | 26 | 1.60 | ○ |
| Example 3 | 38 | 11 | 4.4 | 40 | 38 | 19 | 2.00 | ○ |
| Example 4 | 40 | 12 | 4.5 | 38 | 35 | 21 | 1.67 | ○ |
| Example 5 | 35 | 11 | 4.3 | 44 | 41 | 25 | 1.64 | ○ |
| Example 6 | 36 | 11 | 4.3 | 43 | 39 | 22 | 1.77 | ○ |
| Example 7 | 37 | 11 | 4.4 | 42 | 38 | 22 | 1.73 | ○ |
| Example 8 | 37 | 11 | 4.3 | 43 | 34 | 21 | 1.62 | ○ |
| Example 9 | 38 | 11 | 4.5 | 41 | 35 | 20 | 1.75 | ○ |
| Example 10 | 36 | 11 | 4.4 | 43 | 38 | 23 | 1.65 | ○ |

TABLE 3-continued

| | | | | | | | | |
|---|---|---|---|---|---|---|---|---|
| Example 11 | 36 | 11 | 4.6 | 42 | 40 | 23 | 1.74 | ○ |
| Comparative Example 1 | 38 | 12 | 4.8 | 29 | 33 | 18 | 1.80 | x |
| Comparative Example 2 | 42 | 15 | 4.8 | 33 | 28 | 19 | 1.50 | x |
| Comparative Example 3 | 34 | 10 | 4.1 | 44 | 56 | 39 | 1.42 | Δ |
| Comparative Example 4 | 33 | 12 | 4.5 | 43 | 33 | 21 | 1.55 | Δ |
| Comparative Example 5 | 35 | 12 | 4.4 | 43 | 29 | 23 | 1.26 | Δ |

INDUSTRIAL APPLICABILITY

A silicon carbide porous material of the present invention can be utilized as a material of a catalyst carrier or a DPF. For example, a honeycomb structure constituted of the silicon carbide porous material of the present invention is utilized as a catalyst converter, for example, when a noble metal catalyst is loaded onto the honeycomb structure. That is, one utilization configuration of the honeycomb structure is the catalyst carrier. In particular, the catalyst carrier for an electric heating-type catalyst converter as the catalyst converter is required to have a high thermal shock resistance, and hence the silicon carbide porous material of the present invention is especially preferably utilized.

The invention claimed is:

1. A silicon carbide porous material which includes silicon carbide particles, metal silicon and an oxide phase and in which the silicon carbide particles are bonded to one another via at least one of the metal silicon and the oxide phase,
wherein the oxide phase comprises a parent phase, and a dispersion phase dispersed in the parent phase and having a higher thermal expansion coefficient than the parent phase.

2. The silicon carbide porous material according to claim 1,
wherein a content ratio of the dispersion phase in the oxide phase has a lower limit value of 1 mass % and an upper limit value of 40 mass %.

3. The silicon carbide porous material according to claim 2,
wherein an average particle diameter of the dispersion phase has a lower limit value of 0.1 μm and an upper limit value of 5 μm.

4. The silicon carbide porous material according to claim 2, wherein the dispersion phase is in the shape of a plate, a needle or a fiber.

5. The silicon carbide porous material according to claim 2,
wherein a content ratio of the silicon carbide particles has a lower limit value of 50 mass % and an upper limit value of 80 mass %, a content ratio of the metal silicon has a lower limit value of 15 mass % and an upper limit value of 45 mass %, and a content ratio of an oxide has a lower limit value of 1 mass % and an upper limit value of 25 mass %.

6. The silicon carbide porous material according to claim 2,
wherein the parent phase is an oxide including an alkaline earth metal, aluminum and silicon, and the dispersion phase is an oxide including one or more of an alkaline earth metal, aluminum and silicon.

7. The silicon carbide porous material according to claim 6, wherein the parent phase is cordierite.

8. The silicon carbide porous material according to claim 7, wherein the dispersion phase is mullite.

9. The silicon carbide porous material according to claim 8,
wherein an average particle diameter of the dispersion phase has a lower limit value of 0.1 μm and an upper limit value of 5 μm.

10. The silicon carbide porous material according to claim 8,
wherein the dispersion phase is in the shape of a plate, a needle or a fiber.

11. The silicon carbide porous material according to claim 8,
wherein a content ratio of the silicon carbide particles has a lower limit value of 50 mass % and an upper limit value of 80 mass %, a content ratio of the metal silicon has a lower limit value of 15 mass % and an upper limit value of 45 mass %, and a content ratio of an oxide has a lower limit value of 1 mass % and an upper limit value of 25 mass %.

12. The silicon carbide porous material according to claim 9, wherein the dispersion phase is in the shape of a plate, a needle or a fiber.

13. The silicon carbide porous material according to claim 12,
wherein a content ratio of the silicon carbide particles has a lower limit value of 50 mass % and an upper limit value of 80 mass %, a content ratio of the metal silicon has a lower limit value of 15 mass % and an upper limit value of 45 mass %, and a content ratio of an oxide has a lower limit value of 1 mass % and an upper limit value of 25 mass %.

14. The silicon carbide porous material according to claim 1,
wherein the parent phase is an oxide including an alkaline earth metal, aluminum and silicon, and the dispersion phase is an oxide including one or more of an alkaline earth metal, aluminum and silicon.

15. The silicon carbide porous material according to claim 14, wherein the parent phase is cordierite.

16. The silicon carbide porous material according to claim 15, wherein the dispersion phase is mullite.

17. A honeycomb structure which is constituted of the silicon carbide porous material according to claim 1.

18. An electric heating-type catalyst carrier in which the silicon carbide porous material according to claim 1 is utilized.

19. A honeycomb structure which is constituted of the silicon carbide porous material according to claim 16.

20. An electric heating-type catalyst carrier in which the silicon carbide porous material according to claim 16 is utilized.

21. A silicon carbide porous material which includes silicon carbide particles, metal silicon and an oxide phase and in which the silicon carbide particles are bonded to one another via at least one of the metal silicon and the oxide phase,
   wherein the oxide phase comprises a parent phase, and a dispersion phase dispersed in the parent phase and having a higher thermal expansion coefficient than the parent phase, and
   wherein the parent phase is an oxide including an alkaline earth metal, aluminum and silicon, and the dispersion phase is selected from the group consisting of alumina, cristobalite, forsterite, mullite, sapphirine and spinel.

* * * * *